US007537094B1

(12) United States Patent
Kato (10) Patent No.: US 7,537,094 B1
(45) Date of Patent: May 26, 2009

(54) SELF-ADJUSTING BICYCLE BRAKE ASSEMBLY

(76) Inventor: Gilbert F. Kato, 5090 Wick Dr., Oak Lawn, IL (US) 60543

( * ) Notice: Subject to any disclaimer, the term of this patent is extended or adjusted under 35 U.S.C. 154(b) by 372 days.

(21) Appl. No.: 11/412,352

(22) Filed: Apr. 27, 2006

Related U.S. Application Data (60) Provisional application No. 60/718,461, filed on Sep. 19, 2005.

(51) Int. Cl.
*B62L 1/06* (2006.01)
(52) U.S. Cl. .................. 188/24.13; 188/24.21; 188/2 D
(58) Field of Classification Search ............. 188/24.11, 188/24.12, 24.13, 24.22, 24.21, 2 A, 2 D
See application file for complete search history.

(56) References Cited

U.S. PATENT DOCUMENTS

| 1,469,202 | A | * | 9/1923 | Wood | 188/24.21 |
| 4,163,482 | A | * | 8/1979 | Lauzier | 188/24.21 |
| 4,290,506 | A | * | 9/1981 | Nagano et al. | 188/24.21 |
| 5,484,032 | A | * | 1/1996 | Li | 188/24.21 |
| 5,626,209 | A | * | 5/1997 | Viola | 188/24.21 |
| 5,803,207 | A | * | 9/1998 | Nielsen | 188/24.21 |
| 6,220,399 | B1 | * | 4/2001 | Phillips et al. | 188/24.21 |
| 6,308,806 | B1 | * | 10/2001 | Nielsen | 188/24.21 |

FOREIGN PATENT DOCUMENTS

| DE | 651978 C1 | * | 10/1937 |
| DE | 3310152 A1 | * | 10/1984 |
| EP | 1518786 A1 | * | 3/2005 |
| FR | 969011 A | * | 12/1950 |
| WO | WO 9636526 A1 | * | 11/1996 |

* cited by examiner

*Primary Examiner*—Thomas J Williams
(74) *Attorney, Agent, or Firm*—Adrienne B. Naumann (57) ABSTRACT

Described herein is a bicycle brake assembly which comprises a torsion spring attached to brake arms by bosses. The torsion spring simultaneously attaches to a slide bolt, while the slide bolt attaches to a slide member. When the rider applies pressure upon the bike handlebar levers, the tension from the bicycle cable pulls the slide bolt and engaged slide member upward. The torsion spring attached to the slide bolt flexes, thereby pulling the upper brake arms toward each other. The lower brake arm movement towards the bicycle rim results in abutment of brake shoes against the bicycle rim.

13 Claims, 8 Drawing Sheets

SELF-ADJUSTING BICYCLE BRAKE ASSEMBLY

RELATED APPLICATIONS

This application is related to U.S. Provisional Application No. 60/718,461 filed on Sep. 19, 2005.

BACKGROUND OF THE INVENTION

The present invention relates to bicycle brakes comprising bicycle cables and handlebar levers. In particular, this present invention relates to a new bicycle brake assembly which includes a torsion spring and slide guide with slide member. The current bicycle brake assembly exhibits: self-alignment, uniform forces upon both brake shoes, simplicity of construction and simultaneous engagement of brake shoes.

Many existing bicycles lack effective anti-lock capability. For example, the rider initially depresses prior art brake levers suddenly with maximum effort. The maximum braking force for the rotating wheels occurs just prior to zero rotation, and then the wheels stop rotating and skid.

Furthermore, most brake systems do not self-align, thereby causing one brake shoe with increased applied force from the bicycle cable, to drag against the bicycle rim. This drag results in increased friction and additional work to move the bicycle forward. The lack of self-alignment also causes an uneven bicycle stop as the user depresses the brake levers. My modified bicycle brake possesses a self-align feature, because the bicycle cable and associated components are mechanically constrained within a single rigid mechanical housing known as a slide guide. The torsion spring which connects the bicycle cable movement to the brake arms is vertically aligned along the center of this rigid housing. Consequently brake arms always receive the same torque from the bicycle cable, because there is no unequal upward force from the torsion spring and rigidly constrained bicycle cable whenever the user compresses the handlebar brake levers. In addition, because the brake shoes more evenly contact bicycle rims, the user experiences greater brake pad longevity.

U.S. Pat. No. 4,163,482 (Lauzier) discloses a center pull caliper brake for bicycles. The center-pull brake cable connects to the two calipers by a spring. The spring also serves as a retractor and has the shape of an inverted V. The spring's center connects to the brake cable by a cable anchor, while the spring ends wind around corresponding pins. The two springs ends each press against a corresponding abutment upon each respective caliper.

U.S. Pat. No. 6,308,806 B1 (Nielsen) discloses a brake cable with one end connected to a brake actuator and an opposite end anchored to the handlebar stem. The cable passes through a motion transfer mechanism comprising a link member and a yoke with a pair of arms. The arms are mutually spaced with apertures which contain a shaft with a pulley. The bottom end of the link member contains a shaft with two pairs of rollers. From the brake actuator the cable passes into a steerer tube and around the pulley, re-enters the steerer tube and then exits the cable guide assembly. When a brake handlebar lever is operated, the cable exerts an upward force upon the link member.

U.S. Pat. No. 5,894,913 (Sugimoto) discloses a brake device with a torsion spring, or return spring and a casing. The casing and spring are both coaxially mounted upon a pivot pin, and there are spacing sleeves between the front plate and rear plate comprising a brake arm. The spring is mounted within the casing so that its first end engages a part of the brake fixing mechanism and a second end engages an adjustment screw. The brake cable asymmetrically enters this brake device at the upper brake arm position.

U.S. Pat. No. 4,290,506 (Nagano et al.) discloses a center-pull brake assembly with a brake member which contains a vertical slot. The vertical slot allows vertical adjustment.

U.S. Pat. No. 5,505,105 (Kuo) discloses a connector which is designed to maintain a constant angle between a third cable, which attaches to a bicycle lever, and the connector itself. A first and second cable attached within the connector also connect to a corresponding brake arm. U.S. Pat. No. 5,560,260 (Kuo) discloses another connector, which contain first and second brake cables, and which attaches to corresponding brake arms. A third brake cable extends to a handlebar lever and traverses a bolt within the connector. The bolt is engaged to a nut by a spring and washer. The spring and washer position the third brake cable, and the third brake cable is adjustable by unscrewing the bolt.

According to U.S. Pat. No. 5,560,260 (Kuo), the angle between the first brake cable and the third bracket cable is equal to that between the second brake cable and the third brake cable. Consequently, when the third brake cable is pulled upward, it exerts an equal force to each first and second brake cable. If an adjustment is necessary to alter the distance between the first and second brake cables, the operator loosens the bolt and pulls the third brake cable vertically for a new connector position.

U.S. Pat. No. 5,582,272 (Chen) discloses a center-pull first bicycle cable with a bolt engaged through the upper portions of a bridging device. An aperture in the middle of the bridging device engages a second brake cable. A channel is formed within a bridging device so the two brake cables can align with each other and the center portion of the bridging device.

U.S. Pat. No. 5,484,032 (Li) discloses a hanger device which connects a pull cable and yoke cable within a bicycle brake assembly. The device includes a vertical guide rod fastened to the bicycle fork. A slidable member is mounted upon the guide rod and connects to the pull cable. The slidable member has a transverse-receiving groove which receives the middle section of the yoke cable. There is also an insert member and a fastening unit.

Still referring to Li, the slidable member has four walls, and three of these walls comprise vertical keyways. The slidable member contains the guide rod. Keys extend into corresponding keyways of the guide rod, so that the slidable member slides vertically upon the guide rod.

Still referring to Li, the pull cable extends into the guide rod while its exposed end portions extend into the insert member through an aperture within the slidable member. The yoke cable has two portions, each of which connect to a respective brake arm, as well as an intermediate portion which traverses the grooves of the slidable member. When a brake lever connected to the pull cable is actuated, the pull cable moves upwards, thereby causing upward movement of the slidable member. The yoke cable moves upward, and thereby causes pivoting movement of the brake arms towards each other.

U.S. Pat. No. 4,869,351 (Romano) discloses a center-pull flexible cable which interacts with an articulated parallelogram with four pairs of connecting rods. The cable passes through a block-like second element with first and second vertically aligned apertures. The cable is held in place by a grub screw which is tightly inserted within the lower positioned aperture of this second element. The lowermost aperture has an axis perpendicular to the aperture axis, and the threaded inserted grub screw presses against the cable.

U.S. Pat. No. 4,256,205 (Hamar) discloses a center-pull bicycle cable connection apparatus with a screw rigidly connected to the main actuation cable. The main cable screw engages an adjustment member in a rotating manner, and the screw therefore changes the main cable's tension. U.S. Pat. No. 4,163,482 (Lauzier) discloses a center-pull bicycle cable attachment to a spring which connects to two overlapping calipers.

None of the above patents include a structure for a sliding bicycle brake cable connection in which the entire bicycle cable is mechanically retrained along a centerline through the slide guide mechanical casing of the brake assembly. Similarly, none of the above patents include a torsion spring which is mounted upon a slide bolt along that same centerline, so that the force applied to each brake arm is always equal to the other. The pivoting caliper or cantilever arms are also attached along this centrally aligned axis. In sum, the current invention incorporates a vertical structure for mechanical restraint of the bicycle cable, structurally unique sliding components, cooperating torsion spring and attachment of pivoting brake arms along this same centerline.

SUMMARY OF THE INVENTION

The bicycle brake assembly described herein includes a torsion spring and other cooperating mechanical components within a slide guide. The slide guide mounts upon a bicycle fork by a bracket. The slide guide comprises a mounting stud, and this mounting stud linearly aligns with the remaining brake components along a central vertical axis through the bicycle brake i.e., the centerline. The mounting stud also provides a point around which attached cantilevers or calipers pivot on this same centerline.

Attached to each brake arm, such as a caliper or cantilever, is a brake shoe with mounting hardware. The torsion spring physically attaches to the slide bolt by its single centrally aligned coil. This torsion spring also comprises first and second spring segments which are equal in length to each other. Each first and second spring segment comprises one spring end loop, and each spring end loop attaches to a boss upon a corresponding upper brake arm.

A typical bicycle cable operatively and physically connects handlebar brake levers to a cable holder and the slide member. As the levers are depressed, thereby tensing the bicycle cable, the slide assembly, slide bolt, and torsion spring are pulled upward by the force upon the bicycle cable. As the torsion spring stretches upward at its midpoint at the centrally aligned coil, it urges lower brake arms towards the bicycle rim in a direction and plane perpendicular to the movement of the slide member and slide bolt. The brake arms now press the brake shoes against the wheel rims, thereby stopping the bicycle's forward movement through friction. When the handlebar levers are released, the torsion spring returns to its original non-stretched position with zero force, thereby releasing lower brake arms from the wheel rim.

One of the unique features of the current brake assembly is the torsion spring which acts as a simple beam in bending whenever the rider depresses the brake levers. The bending behavior provides a uniform force on both brake pads because of the centrally applied force from the tensed bicycle cable within the slide guide mechanical boundaries. These bending characteristics also establish the maximum force that can be applied to each brake shoe. This antilock feature prevents wheels from locking, skidding, loss of steering control and this feature also increases stopping capability.

Many prior art brakes are asymmetrically attached to the bicycle cable, with the result that force upon the handle bar brake levers is not uniformly applied. Other prior art brakes, such as those discussed supra, although the cable is centrally aligned, do not comprise the mechanically constrained center line alignment of a slide member with engaged slide bolt and torsion spring. One brake shoe, with such unequal force from an asymmetrically attached cable or non-controlled connector to the caliper or cantilever arms, contacts the bicycle rim more snugly than the opposite brake shoe. This unequal force causes uneven wear of the brake shoes, whenever more friction is applied to one side of the rim then the other.

Other prior art brakes are centrally attached to the calipers or cantilever pivot point by a mechanically unrestrained bicycle cable. With these models, there is no manner in which to maintain the bicycle cable within a uniformly aligned configuration. Eventually each cable deviates laterally, thereby applying less uniform torque to the wire which connects to the brake arms. Another improvement of my brake assembly is the central attachment of the bicycle cable along the slide guide centerline. The centrally aligned cable is maintained rigidly linear and centrally located by the slide guide walls. Bicycle cable 18b's vertical movement is further restricted by within the rigid longitudinal slots within the slide guide walls.

The torsion spring with a single coil is centrally connected along the same limited longitudinal axis within and between these vertical grooves. Each spring straight segment is the same length as the other, and each straight spring segment provides the same force to each brake arm. Consequently, the torsion spring which is centrally aligned by its single central coil, requires each brake shoe to pivot and contact opposing sides of the bicycle rim in a uniform manner.

The current brake assembly also compensates for irregularities and tire rim defects and road irregularities, thereby minimizing brake damage. In particular the torsion spring coil flexes whenever the wheel strikes potholes and bumps. The two spring arms can flex individually in different directions simultaneously, thereby providing a constant force between the brake pads and wheel rim.

The current brake assembly provides unique features to caliper braking and is easily adapted to other bicycle brakes. This is particularly true for slide guides in combination with either new or prior art caliper brakes. The user can also easily modify the stopping parameters of the brake assembly by changing the number of torsion spring coils, wire thickness, or the material mechanical properties of which the spring is made.

Accordingly, a goal of the present invention is to provide an improved bicycle brake assembly with self-alignment.

Another object of the present invention is to provide braking assembly which applies uniform force upon both brake shoes.

Another object of the present invention is to provide a bicycle brake assembly with structurally simple components.

Another object of the present invention is to provide a bicycle brake assembly wherein brake shoes engage opposing sides of a wheel simultaneously.

Another object of the present invention is to provide a bicycle brake assembly with an anti-lock feature.

These and other features and advantages of the invention are more fully illustrated by the DETAILED DESCRIPTION OF THE INVENTION and accompanying drawings, infra.

DETAILED DESCRIPTION OF THE PREFERRED EMBODIMENT AND OTHER EMBODIMENTS

Brake arms of a bicycle brake assembly can be cantilevers or calipers. Brake arms can also comprise other varieties of pivoting or flexing bilateral devices which contain perpendicularly aligned components, often referred to as "brake shoes." Upon receiving force from other brake components, brake shoes move towards the bicycle rim and press upon it, thereby halting movement of the bicycle wheel.

Brake Assembly 10 in the Preferred Embodiment

Figure 3:
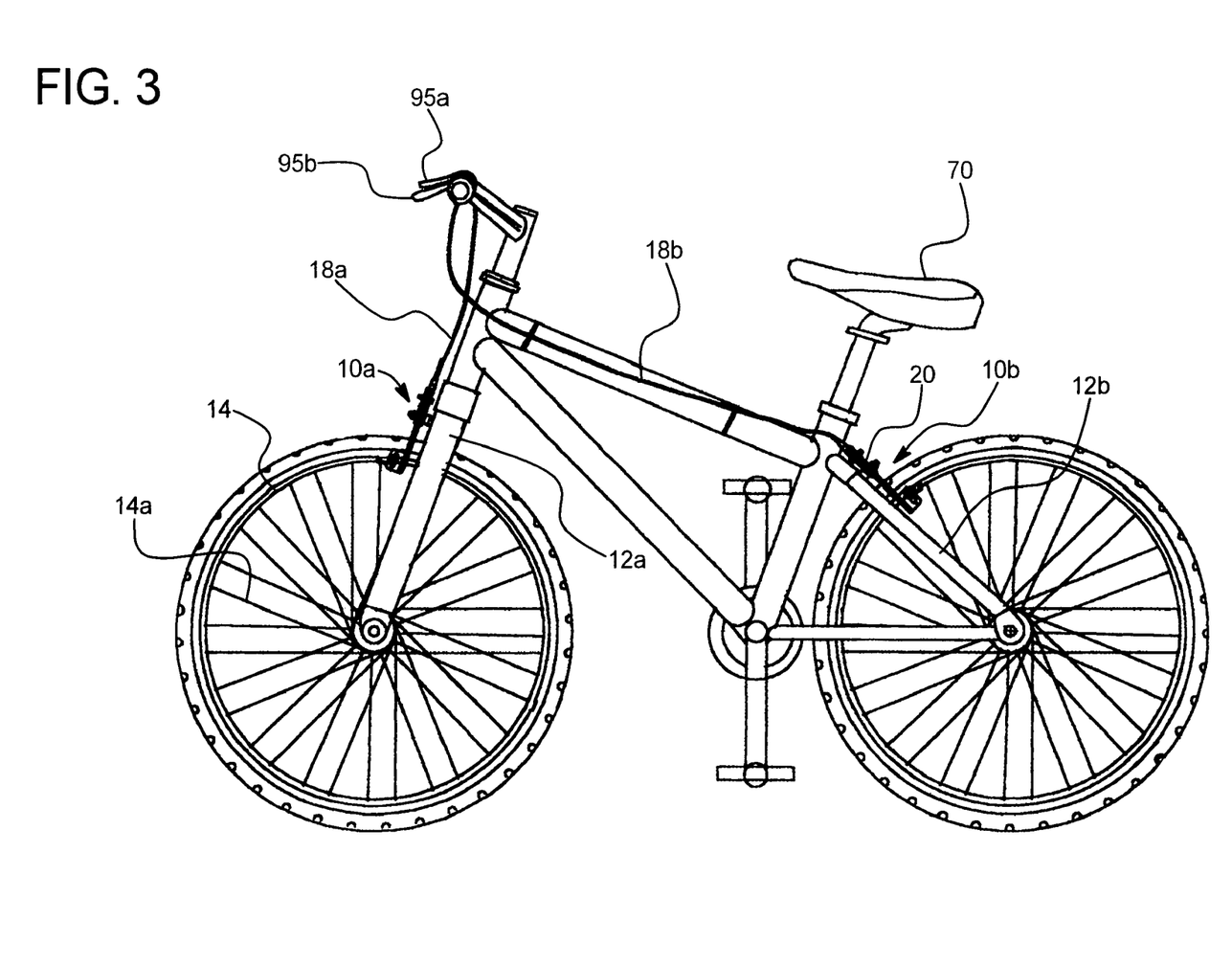
FIG. 3 illustrates two brake assemblies of FIG. 1 which are mounted operationally upon a typical bicycle.

In the preferred embodiment, brake arms comprise calipers 90a, 90b, infra. Referring initially to FIG. 3, anterior bicycle brake assembly 10a ['anterior assembly 10a'] is located anterior to anterior bicycle fork 12a. Anterior assembly 10a attaches to anterior bicycle fork 12a by anterior bracket 13a (not seen). Anterior assembly 10a attaches to anterior handlebar lever 95a by anterior bicycle cable 18a.

Still referring to FIG. 3, posterior bicycle brake assembly 10b ['posterior assembly 10b'] is located posterior to bicycle seat 70. Posterior assembly 10b attaches to posterior bicycle fork 12b by posterior bracket 13b (not seen). Posterior assembly 10b attaches to handlebar lever 95b by posterior bicycle cable 18b. In all other respects anterior assembly 10a and posterior assembly 10b are structurally and functionally identical to each other. In the following discussion, all references are to posterior assembly 10b, but this discussion also applies to anterior assembly 10a unless otherwise noted.

Figure 1:
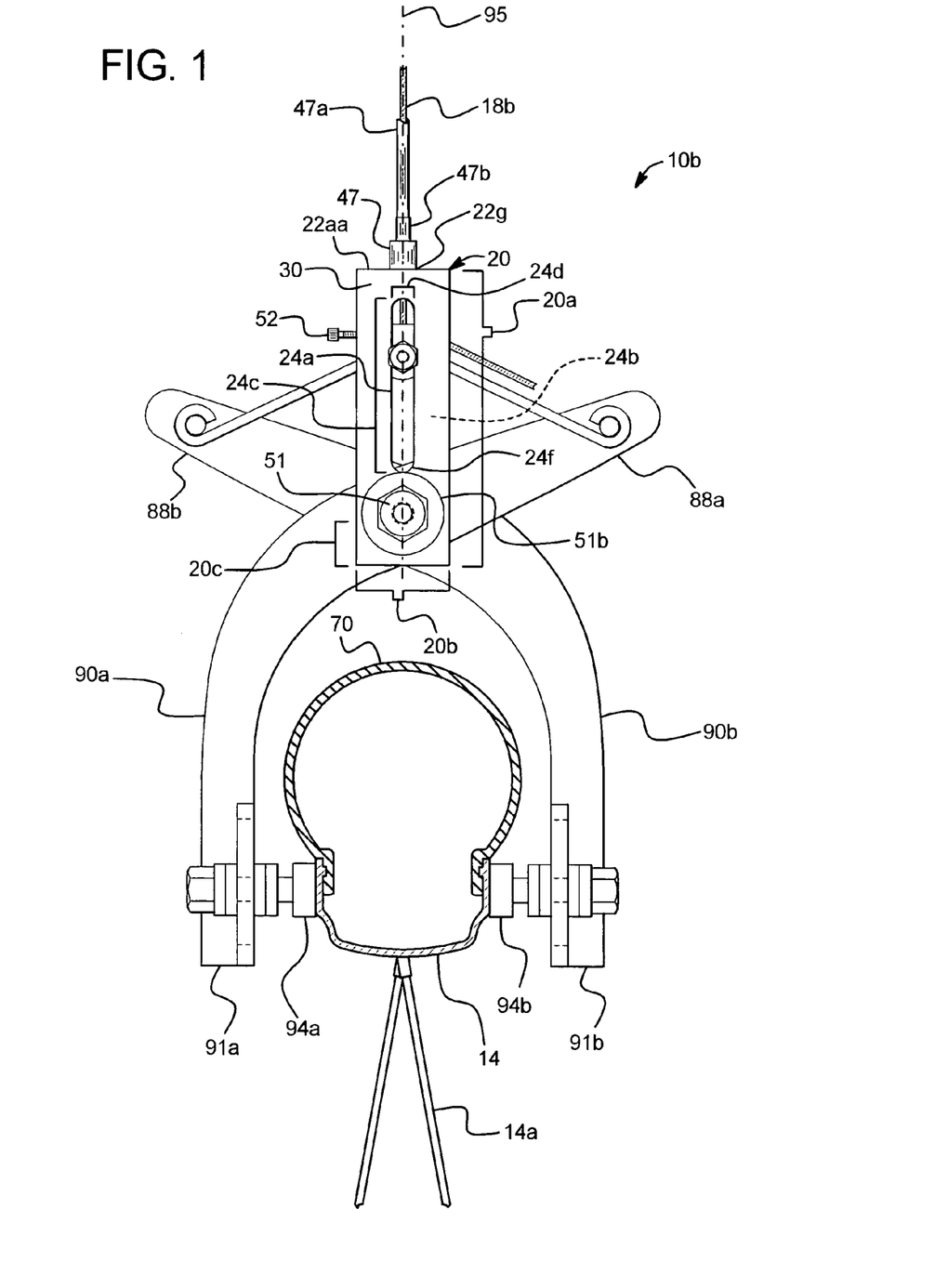
FIG. 1 illustrates a full anterior view of a bicycle brake assembly of the preferred embodiment.
Figure 2A:
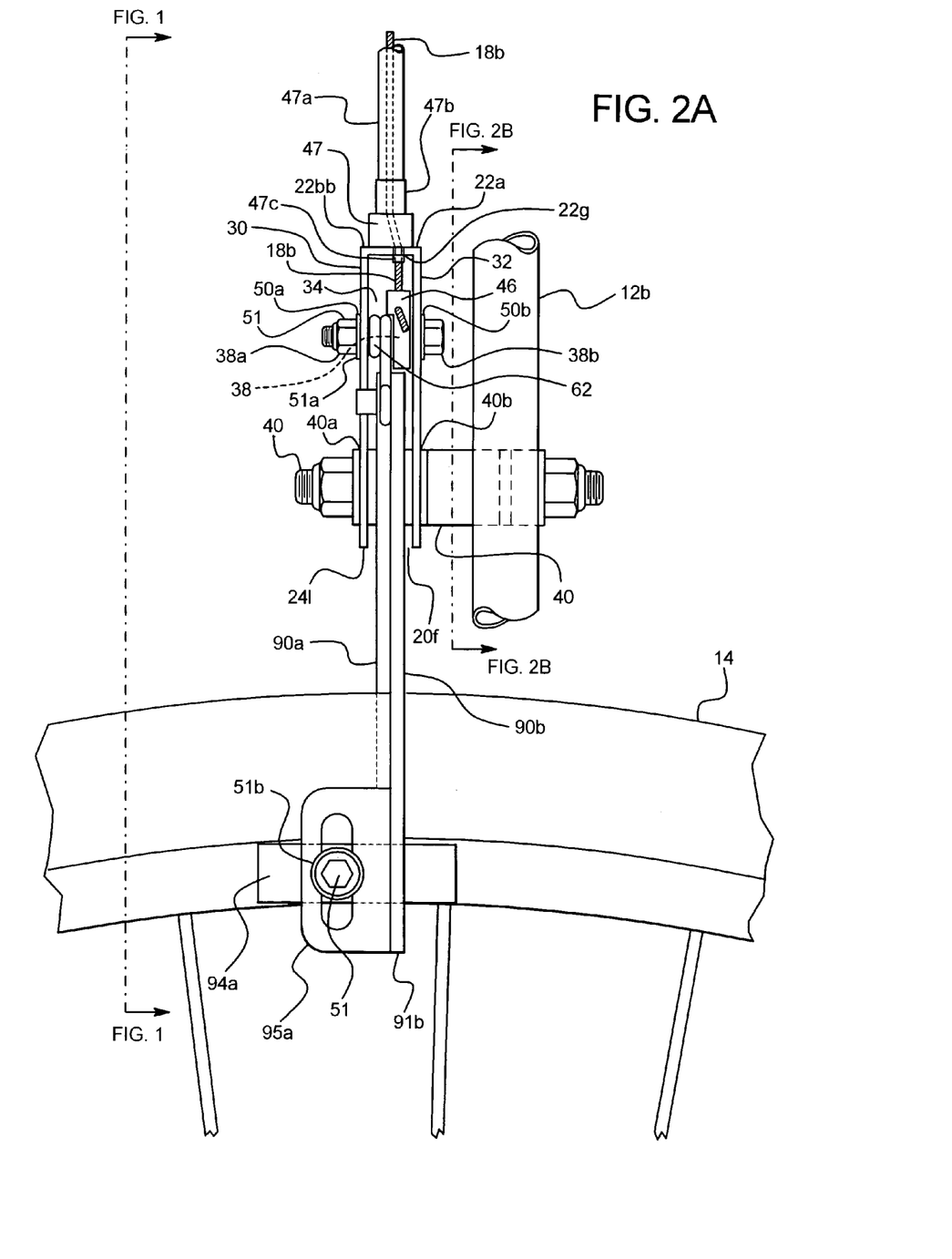
FIG. 2A illustrates a lateral view of the bicycle brake assembly of FIG. 1.
Figure 2B:
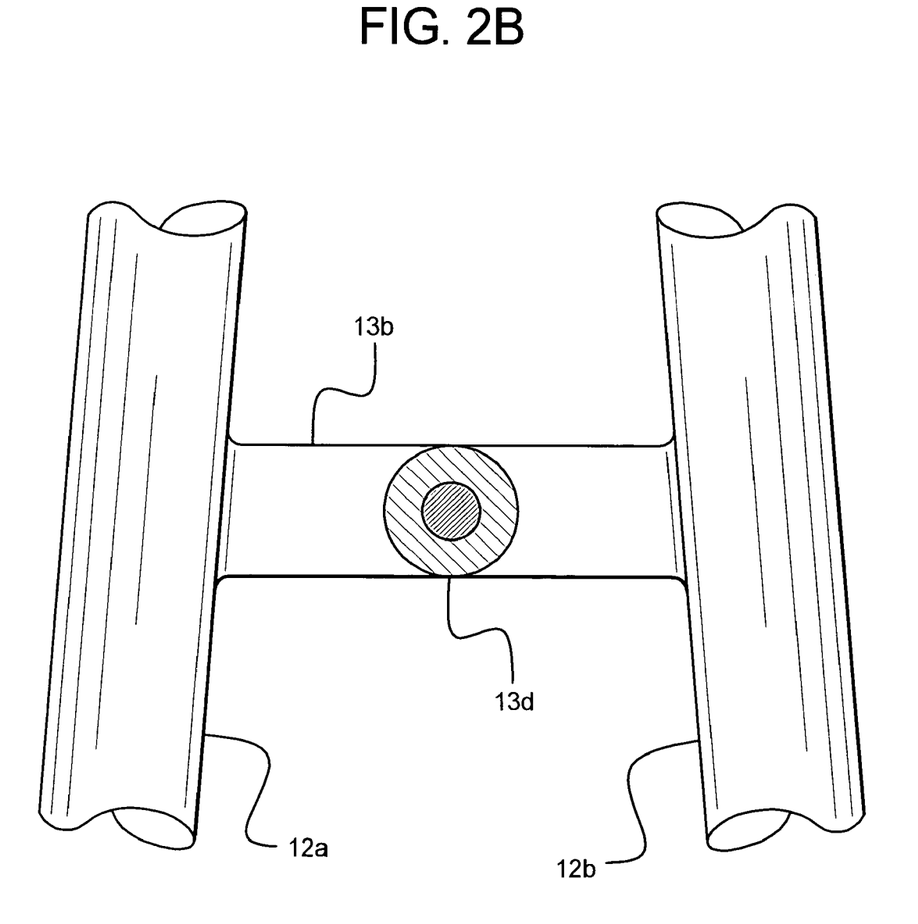
FIG. 2B illustrates an isolated view of the bracket through line A-A of FIG. 1.

Referring now to FIGS. 1, 2A and 2B, posterior assembly 10b comprises slide guide 20 which receives bicycle cable 18b through cylindrical cable aperture 22g within uppermost guide wall 22a. Preferably slide guide 20 is approximately 2.50 inches in longitudinal length 20a, 0.75 inch in width 20b, and 0.50 inch in depth 20c. Slide guide 20 is mounted upon posterior bracket 13b, and is preferably attached to posterior bracket 13b with lock nuts 51, lock washer 51a, lower friction washers 51b, and threaded spacer 49 upon mounting stud 40. See FIG. 4.

Still referring to FIGS. 1 and 2A, slide guide 20 comprises an anterior longitudinal wall 30 and a parallel opposing posterior longitudinal wall 32. Anterior longitudinal wall 30 contains first longitudinal slot 24a, while posterior longitudinal wall 32 contains second longitudinal slot 24b (not seen). Longitudinal slots 24a, 24b are parallel to, and oppose each other, and longitudinal slots 24a, 24b comprise identical dimensions to each other.

Still referring to FIGS. 1, 2A and 2B, longitudinal slots 24a, 24b are parallel to longitudinal wall length 20a. Each longitudinal slot 24a, 24b is preferably approximately 1.50 inch in longitudinal slot length 24c, approximately 0.25 inch in slot width 24d, and one-sixteenth inch in longitudinal wall thickness 24l. Uppermost wall thickness 22 is approximately one-sixteenth inch. Mounting stud 40 is positioned exterior to slot base 24f of each first and second longitudinal slot 24a, 24b respectively. Mounting stud 40 protrudes from physically separate first and second stud apertures 40a, 40b respectively within anterior longitudinal wall 30 and posterior longitudinal wall 32 respectively.

Still referring to FIGS. 1, 2A and 2B, uppermost wall 22a is preferably approximately 0.75 inch in uppermost length 22aa and 0.50 inch in uppermost width 22bb. Uppermost wall 22a is integrally continuous with, and lies in a plane perpendicular to, opposing parallel longitudinal walls 30, 32. Uppermost wall 22a comprises cylindrical bicycle cable guide 47, and into which posterior bicycle cable 18b threads before it penetrates slide guide 20 through cable aperture 22g. Posterior bicycle cable 18b also comprises bicycle cable protector 47a, which consists of a flexible plastic tube with metal cap 47b. Cable aperture 22g contains threaded cable connector 47c which posterior bicycle cable 18b traverses to enter slide guide 20.

Referring to FIG. 2A, longitudinal walls 30, 32 and uppermost wall 22a define a three-dimensional interior vertical guide channel 34. Guide channel 34 is parallel to longitudinal length 20a and is open at opposite slide guide lower end 20f. Bicycle cable 18b initially enters guide channel 34 vertically downward from threaded cable connector 47c. Mounting stud 40 linearly traverses vertical guide channel 34 between anterior and posterior longitudinal walls 30, 32.

Figure 4:
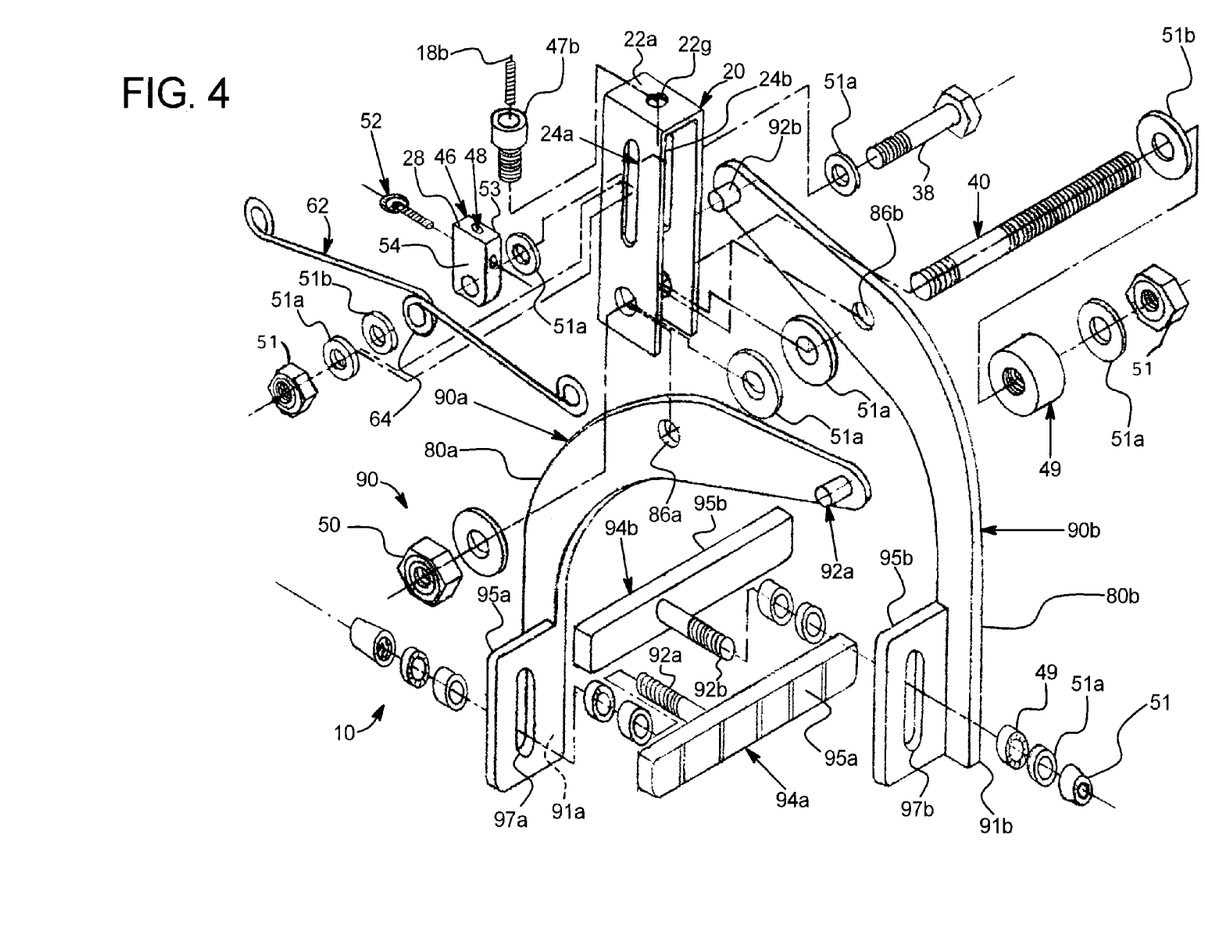
FIG. 4 illustrates an exploded view of the bicycle brake assembly of FIG. 1.

Referring now to FIGS. 2A and 4, slide bolt 38 linearly and rigidly penetrates first longitudinal slot 24a and second longitudinal slot 24b within guide channel 34. Lock nut 51 and low friction washer 51b engage slide bolt 38 at first and second slide bolt apertures 50a, 50b through each anterior and posterior longitudinal wall 30, 32 respectively. Slide bolt 38 comprises lock washer 51a and lock nut 51 on either of its respective first and second ends 38a, 38b. Lock washers 51a and lock nuts 51 retain slide bolt 38 within longitudinal slots 24a, 24b.

Referring to FIGS. 2A, 4, 4A and 4B immediately adjacent to posterior longitudinal wall 32 is slide member 46 which is made of a single unitary metal piece. Slide member 46 comprises integrally attached member uppermost wall 53, anterior member wall 54, posterior member wall 56, lowermost member wall 56a, and first and second opposing sidewalls 56b, 56c respectively.

Figure 4A:
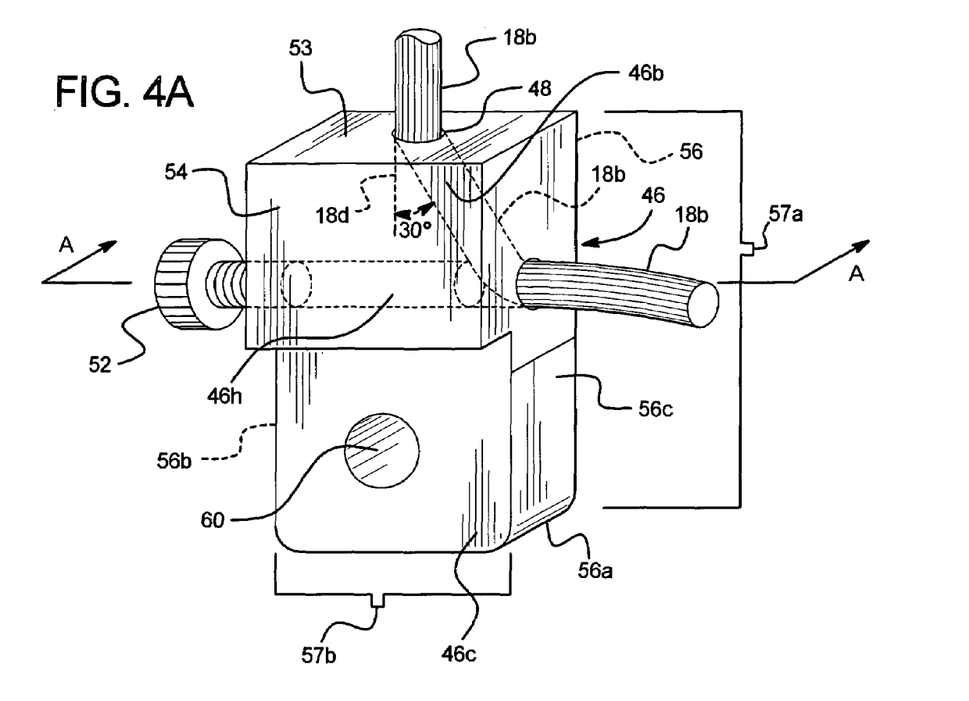
FIG. 4A illustrates an isolated closeup view of a slide member.
Figure 4B:
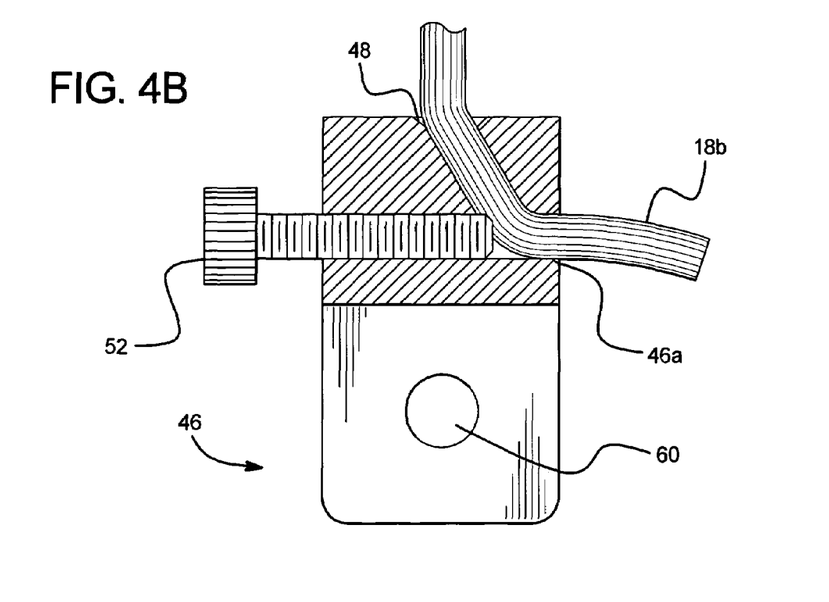
FIG. 4B illustrates an isolated view of a slide member through view line A-A of FIG. 4A.

Still referring to FIGS. 4A and 4B, member uppermost wall 53 is integral to, and lies perpendicular to, anterior and posterior member walls 54, 56 respectively. Uppermost member wall 53 is also parallel to, and opposes, lowermost member wall 56a. First and second opposing sidewalls 56b, 56c are integrally attached to remaining member walls, so slide assembly 46 approximately forms a partially rectangular solid. Slide member 46 also comprises slide bore 60 into which slide bolt 38 inserts.

Referring now to FIGS. 4, 4A and 4B, uppermost member wall 53 contains and defines top member aperture 48. Top member aperture 48 receives posterior bicycle cable 18b. Bicycle cable 18b re-emerges through second guide aperture 46a within second opposing side member wall 56c. Top member aperture 48 is approximately 5/64 inch is diameter, and uppermost member wall 53 is approximately 3/16 inch along each of its four sides. A 4-40 socket head cap screw 52 secures bicycle cable 18b within slide member 46.

Still referring to FIGS. 4A and 4B, slide member 46 contains slide bore 60 which receives slide bolt 38, whenever slide bolt 38 penetrates first and second longitudinal walls 30, 32 respectively. Slide member 46 has lesser depth 46c where slide bore 60 penetrates slide member 46, and this depth is approximately 1/16 inch. Lesser depth 46c is necessary, because torsion spring 62 requires space between slide guide 20 and slide member 46. If this clearance is not provided, different sized slide guides 20 are necessary to accommodate slide member 46 and torsion spring 62. Slide bore 60 is preferably approximately one-quarter inch in diameter. The 4-40 socket head cap screw 52 enters first opposing sidewall 56*b* approximately 7/32 inch from uppermost member wall 53. Slide member 46 engages slide guide 20 by slide bolt 38 within bore 60, and slide bolt 38 remains within guide channel 34. Each slide member 46 is approximately 11/16 inch in longitudinal length 57*a* and approximately 3/8 inch in width 57*b*.

Still referring to FIGS. 4A and 4B, posterior bicycle cable 18*b* enters slide member 46 through upper member aperture 48 and bends approximately 30 degrees from a plane which is perpendicular to uppermost member wall 53. Bicycle cable 18*b* traverses first member channel 46*b*, and then bends and exits from side member aperture 46*a*. The 4-40 socket head cap screw 52 penetrates first opposing member wall 56*b* and enters second member channel 46*h*. Second member channel 46*h* is parallel to lowermost member wall 56*a* and converges with first member channel 46*b*. Second member channel 46*h* contains threads to engage threaded 4-40 cap screw 52. Cap screw 52 threads within second member channel 46*h* until it tightly abuts bicycle cable 18*b*. Cap screw 52 thereby mechanically and frictionally holds bicycle cable 18*b* firmly in place within slide member 46.

Figure 6:
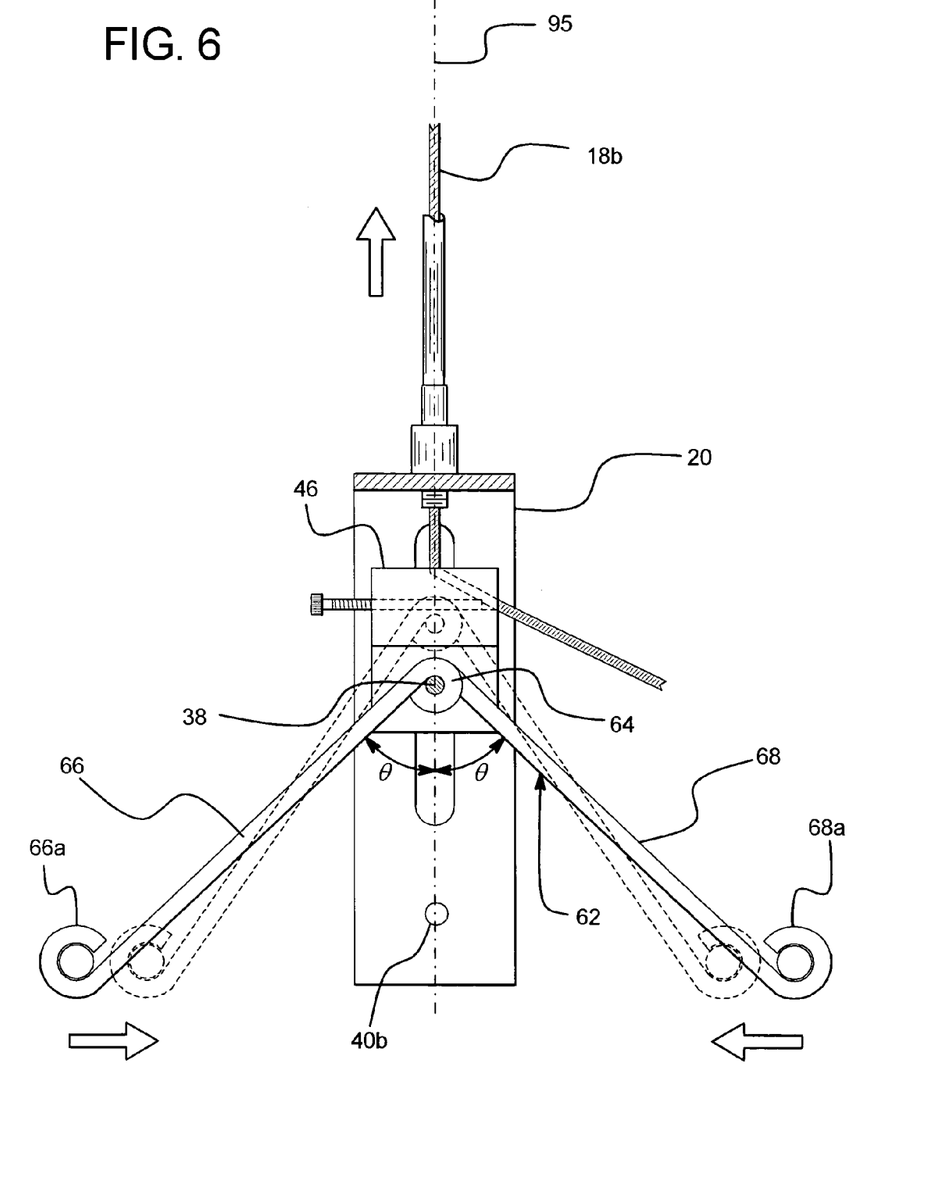
FIG. 6 illustrates a closeup isolated anterior view of the torsion spring and its bending behavior.

Referring now to FIGS. 2A, 4 and 6, torsion spring 62 traverses guide channel 34 and is oriented perpendicular to longitudinal length 20*a* along slide bolt 38. Torsion spring 62 is preferably approximately 4.75 inches in length when fully extended. Torsion spring 62 includes continuous first lateral straight spring segment 66, continuous second lateral straight spring segment 68 and integral middle spring coil 64. Middle spring coil 64 encircles one complete circumference of slide bolt 38 anterior to slide member 46 and adjacent to caliper 92, infra.

Referring in particular to FIG. 6, first straight segment 66 terminates in first spring hook 66*a*. Second straight spring segment 68 terminates in second spring hook 68*a*, which is identical to first spring hook 66*a*. Integral middle spring coil 64 is located at the midpoint of torsion spring 62, so each first straight spring segment 66 is the identical length as second straight spring segment 68.

Referring to FIGS. 1, 2A and 4, first and second spring hook 66*a*, 68*a* each attach to a corresponding first and second boss 92*a*, 92*b* respectively within first and second calipers 90*a*, 90*b* respectively. Each caliper 90*a*, 90*b* comprises a first and second upper caliper component 88*a*, 88*b* respectively, and each upper caliper component 88*a*, 88*b* comprises corresponding first or second upper boss 92*a*, 92*b*.

Still referring to FIGS. 1 and 4, each caliper 90*a*, 90*b* respectively also comprises a first or second caliper aperture 86*a*, 86*b* respectively. Caliper apertures 86*a*, 86*b* congruently align when calipers 90*a*, 90*b* are assembled and secured with mounting stud 40 penetrating caliper apertures 86*a*, 86*b* and first and second stud apertures 40*a*, 40*b*. When so attached with mounting stud 40, first and second caliper arms 80*a*, 80*b* pivot in a limited manner around mounting stud 40. Preferably caliper 90*a* overlaps caliper 90*b* while both are positioned within guide slide channel 34. First and second upper caliper arms 88*a*, 88*b* respectively attach to posterior brake assembly 10 by mounting stud 40.

Still referring to FIGS. 1 and 4, each first and second lower caliper arm 80*a*, 80*b* comprises one corresponding first and second brake shoe 94*a*, 94*b* respectively, at each corresponding caliper arm end 91*a*, 91*b* respectively. Each brake shoe 94*a*, 94*b* attaches rigidly to corresponding caliper arm end 91*a*, 91*b* by first and second shoe bolt 99*a*, 99*b* respectively. Each shoe bolt 92*a*, 92*b* penetrates a first and second shoe slot 97*a*, 97*b* respectively within first and second shoe face 95*a*, 95*b* respectively. Each shoe face 95*a*, 95*b* protrudes at a right angle to its corresponding caliper 90*a*, 90*b* respectively.

Referring now to FIGS. 1 and 6, a hypothetical centerline 95 bisects slide guide 20, slide member 46, cable guide 47, slide bolt 38, torsion spring 62 and mounting stud 40. Centerline 95 provides the longitudinal central axis along which slide member 46, slide bolt 38 and slide torsion spring 62 move vertically in a mechanically restricted manner within guide channel 34. Centerline 95 also is the longitudinal central axis upon which mounting study 40 lies and around which calipers 90*a*, 90*b* pivot.

As best seen in FIG. 6, slide bolt 38, slide member 46 and posterior bicycle cable 18*b* engage each other along centerline 95 and move vertically upward within slide guide 20 whenever there is vertically applied tension upon posterior bicycle cable 18*b*. Slide bolt 38, and therefore slide member 46, are further restricted from lateral or other non-vertical movement by alignment within longitudinal slots 24*a*, 24*b*.

The following brakes can be modified to combine with the new self-adjusting brake as described supra:

U.S. Pat. Nos. 6,098,356; 5,293,965 and 5,515,946 (Shimano);

U.S. Pat. No. 4,969,539 (Bridgestone); and

U.S. Pat. No. 4,838,387 (Yoshigai).

Operation of Brake Assembly 10

As the rider depresses brake levers 95*a*, 95*b*, the attached posterior bicycle cable wire 18*b* stretches from the applied force. In this condition posterior cable wire 18*b* then pulls slide member 46 upward vertically within guide channel 34. Because slide member 46 contains slide bolt 38 within slide bore 50, slide bolt 38 also moves vertically upwardly within rigid circumscribing longitudinal slots 24*a*, 24*b*. Middle spring coil 64, centered upon centerline 95 and coiled around slide bolt 38, moves upward vertically with slide bolt 38.

As seen in FIG. 6, each straight spring segment 66 forms angle theta with centerline 95. Angle theta of straight spring segment 66 is equal to angle theta of straight spring segment 68 when each straight segment 66 is equal in length to straight segment 68. Each angle theta decreases with increasing force upon posterior bicycle cable 18*b*, but at all values angle theta is the same value on either side of centerline 95. Consequently, the magnitude and direction of force along each first straight spring segment 66 will also be the same as that for second straight spring segment 68. This is true for highly elastic objects such as metal bodies, because the spring deformation is directly proportional to the magnitude of the applied force from brake lever 95*a*, 95*b* (provided the elastic limit is not exceeded).

Consequently the force transmitted to each brake shoe 94*a* will always equal that of brake shoe 94*b*. This feature will persist, even though each straight spring segment 66, 68 may twist or flex three-dimensionally, and independently of the other (to adjust brake shoe orientation). Both angles theta will vary by the same degree, depending upon the physical characteristics of torsion spring 62. In the preferred embodiment and best mode, angle theta is approximately 64 degrees in a zero force situation. Also in the preferred embodiment and best mode, angle theta is approximately 59 degrees whenever posterior bicycle cable 18*b* transmits the maximum vertically directed force. However, values of theta will also depend on the thickness of bicycle rim 14. Angle theta remains the same value with respect to each straight segment 66,68, even if each straight spring segment 66, 68 twists laterally.

Still referring FIG. 6, each straight spring segment 66, 68 now pulls corresponding boss 92a, 92b upward. Consequently each spring segment 66, 68 now pulls its corresponding attached caliper upper arms 88a, 88b upward. Caliper upper components 88a, 88b move upward as they pivot around mounting bolt 40. Perpendicular aligned first and second brake shoes 94a, 94b, each located on an opposing side of bicycle rim 14, now move towards bicycle rim 14 attached to bicycle spokes 14a. This movement is in a plane perpendicular to the vertical upward movement of slide member 46 with attached slide bolt 38 and torsion spring 62. The resulting movement of lower caliper arms 80a, 80b pushes brake shoes 94a, 94b against bicycle rim 14, creating friction and thereby halting rotation of bicycle rim 14.

When the rider releases handlebar brake levers 95a, 95b, tension within posterior bicycle cable wire 18b dissipates. Slide member 46 with engaged slide bolt 38 now falls vertically within rigid longitudinal walls 30, 32 and along longitudinal slots 24a, 24b. Each caliper boss 92a, 92b with corresponding upper caliper components 88a, 88b falls vertically, because torsion spring coil 64 no longer flexes upwardly at mounting stud 40. As upper arm portions 88a, 88b fall vertically, lower caliper arms 80a, 80b pivot around mounting stud 40 and brake shoes 94a, 94b move from bicycle rim 14.

The bicycle manufacturer changes torsion spring 62 to modify brake behavior characteristics by (i) varying the number of spring coils; (ii) changing the thickness of the spring wire; or (iii) changing the material (and therefore the tensile strength and elasticity), of which torsion spring 62 is made. By changing these parameters the manufacturer increases or decreases the minimum and maximum stopping distance of the bicycle. For example, a heavier rider requires a spring with a greater spring constant, greater wire thickness and greater tensile strength.

Cantilever Brake Assembly 100

Figure 5:
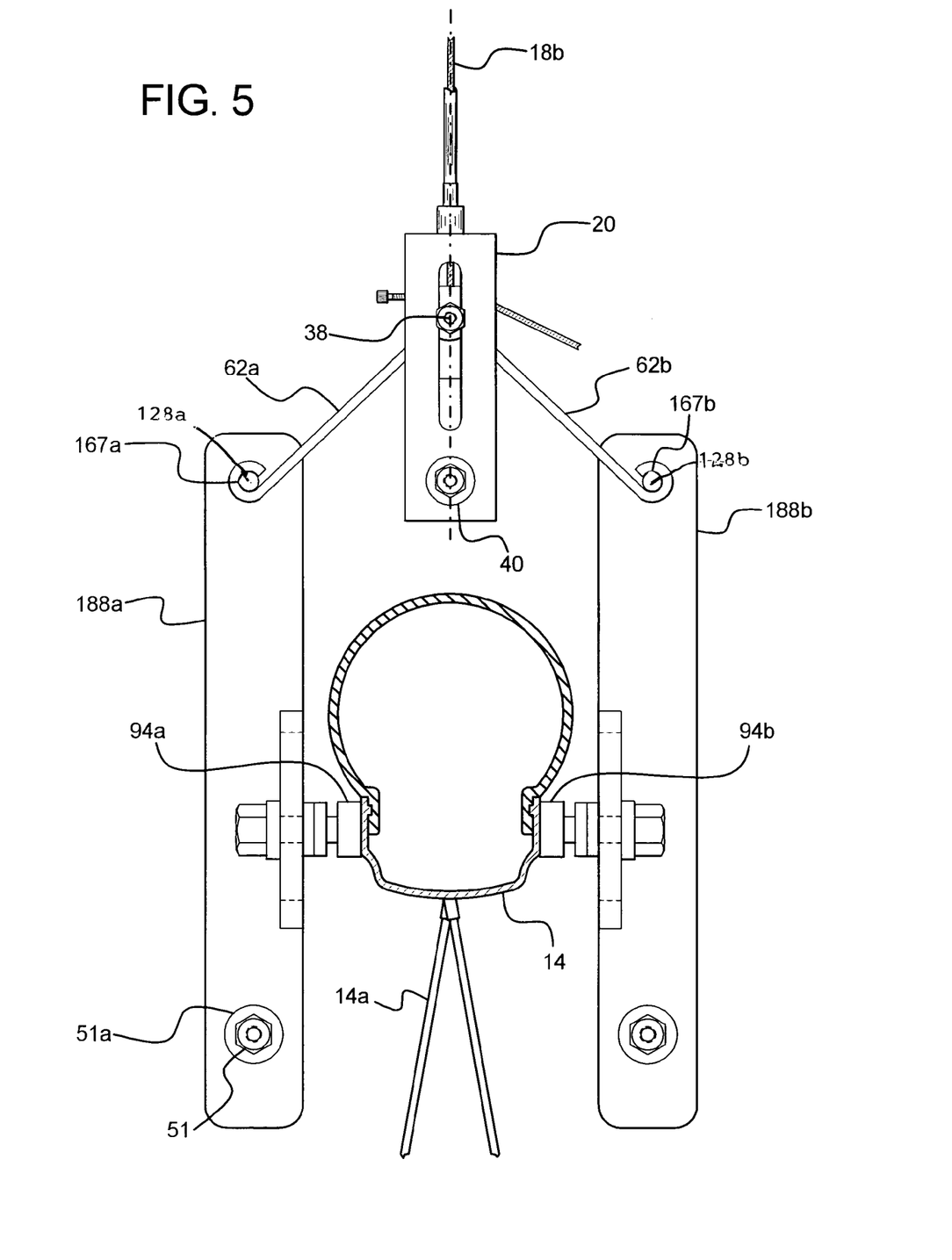
FIG. 5 illustrates an anterior view of a bicycle brake assembly with cantilevers.

Referring now to FIG. 5, brake assembly 10 is adaptable to cantilever brake assemblies, such as a "V" type brake. In this embodiment, caliper arms 80a, 80b are replaced with first and second cantilevers 188a, 188b respectively which pivot around bicycle fork 12a, 12b respectively. Slide guide 20 mounts upon bracket 13a, 13b respectively, and brackets 13a, 13b attach to bicycle forks 12a, 12b respectively.

Still referring to FIG. 5, first and second torsion cantilever spring segments 62a, 62b respectively, attach to each first and second cantilever boss 167a, 167b respectively by first and second spring hooks 66a, 68a respectively. Cantilever bosses 167a, 167b lie at the upper end of each first and second upper cantilever arm 188a, 188b. In all other respects, brake assembly for a V-brake is structurally identical to that of preferred caliper embodiment 10 described supra.

Materials

Slide guide 20, cable holders 47, calipers 90a, 90b and cable guide 47 are preferably made from aluminum, and most preferably die-cast aluminum. However, titanium and nickel bearing steels are also satisfactory. These components can be formed, investment casted, forged, stamped or machined, but preferably they are die cast. Nuts 51, bolts 38 and mounting studs 40 are preferably made of machined carbon steel Flat washers 51a are preferably made of nylon or other low friction materials which are extruded. Torsion springs 62 are preferably made of high tensile steel, but piano wire and high carbon alloy steel are also satisfactory.

Mounting of Brake Assembly 10 with Calipers to Bicycle

The mounting of the preferred embodiment of brake assembly 10a or 10b proceeds as follows:

1. The operator initially align brake assembly 10a, 10b to anterior bracket 13a or posterior bracket 13b as the case may be. He or she inserts mounting stud 40 through aperture 13c within bracket 13a or 13b, places washer 51a around stud 40, and then threads and tightens lock nut 51 upon stud 40.
2. The operator then inserts cable 18a or 18b through aperture 48 and depresses lever arms 95a, 95b. The operator pulls cable 18a, 18b through lever arms 95a, 95b until he or she obtains the desired distance between wheel rim 14 and brake shoes 94a and 94b. He or she tightens cap screw 52 until bicycle cable 18a or 18b locks firmly and tightly in place within slide member 46.

Mounting Cantilever Brake Assembly 100

1. The operator first mounts slide guide 20 to anterior bracket 13a or posterior bracket 13b as the case may be. The operator next inserts mounting stud 40 through apertures 40a, 40b within bracket 13a, 13b and places washer 51a and lock nut 51 around stud 40. He or she then threads and tighten lock nut 51a onto stud 40.
2. The operator now mounts cantilever arms 188a, 188b to corresponding bosses 167a, 167b respectively. He or she then installs bolts 128a, 128b into their respective threaded bosses 167a and 167b.
3. The operator next positions spring hooks 66a, 68a upon their corresponding bosses 167a, and 167b respectively.
4. The operator now inserts cable 18a or 18b through aperture 48 and manually pushes cantilever arms 188a, 188b inward. He or she then pulls bicycle cable 18a, 18b upward from slide member 46 until he or she attains the desired distance between bicycle rim 14 and brake shoes 94a, 94b whenever there is no braking movement. He or she then tightens cap screw 52 until bicycle cable 18a or 18b is snugly secured with slide member 46.

Modification of Prior Art Brake Assemblies

To modify the prior art brakes, supra paragraph 62:

1. The operator initially removes the original brake assembly from the prior art brake shoes and brake arms.
2. He or she installs a stud 40 upon each bicycle brake arm (such as a cantilever or caliper). If necessary, he or she modifies the brake arms to provide maximal mechanical advantage as levers.
3. The operator now installs slide guide 20 with the assembly procedure for that embodiment supra. He or she installs slide guide 20 for cantilever brake assembly 100 by using the assembly procedure for that embodiment supra.

The invention claimed is:

1. A bicycle brake assembly comprising a hypothetical center line, said hypothetical center line bisecting said bicycle brake assembly, said bicycle brake assembly further comprising handlebar levers, bicycle forks and bicycle brake cables, said bicycle brake assembly further comprising,
    (A) a slide guide mounted upon said bicycle fork, said slide guide comprising a first longitudinal slot and a second longitudinal slot,
    (B) a slide member, said slide member adapted to move vertically within said slide guide, said slide member attaching to one said bicycle brake cable, said bicycle brake cable connecting said brake assembly to said handlebar levers,
    (C) a slide bolt engaging said slide member, said slide bolt further engaging said first and second longitudinal slots, (D) a first brake arm and a second brake arm, said first and second brake arms pivotally connected to each other, and (E) a torsion spring attaching to said slide bolt and said brake arms, whereby said slide bolt and said slide member and said torsion spring move vertically upward from force applied to said bicycle cable by said bicycle handlebar lever, said torsion spring thereby flexing said brake arms, said brake arms pressing said brake shoes against a bicycle rim, said slide bolt, slide member and said torsion spring being axially aligned along said hypothetical center line.

2. The bicycle brake assembly of claim 1 wherein said slide guide comprises a mounting stud, said mounting stud connecting said brake arms.

3. The bicycle brake assembly of claim 1 wherein said brake arms each comprises a corresponding caliper.

4. The bicycle brake assembly of claim 3 wherein said calipers each comprise a caliper boss, said torsion spring winding around each said caliper boss.

5. The bicycle brake assembly of claim 1 wherein said slide member engages said slide bolt by a cylindrical bore, said slide bolt inserting within said cylindrical bore.

6. The bicycle brake assembly of claim 1 wherein said slide member comprises two channels.

7. The bicycle brake assembly of claim 1 wherein said torsion spring comprises a first lateral straight spring segment and a second lateral straight spring segment, each said lateral straight spring segment being equal in length to the other, each said lateral straight spring segment forming an angle with said hypothetical center line, said angle between said first lateral straight spring segment being equal to said angle between said lateral second straight spring segment and said hypothetical center line.

8. The bicycle brake assembly of claim 1 wherein each said brake arm comprises a cantilever.

9. The bicycle brake assembly of claim 1 wherein each torsion spring comprises one middle spring coil, said middle spring coil axially aligned along said hypothetical center line.

10. The bicycle brake assembly of claim 1 wherein said slide guide comprises a cable aperture.

11. A bicycle brake assembly operatively mounted upon a bicycle, said bicycle brake assembly comprising A. a bilaterally symmetrical device, B. a first brake arm and a second overlapping brake arm, said brake arms operatively connected to said bilaterally symmetrical device, C. a bicycle cable operatively connected to said bilaterally symmetrical device and said brake arms, D. an elastic behaving spring, said spring comprising a first straight spring segment and a second straight spring segment, said first brake arm operatively attached to said first straight spring segment, said second overlapping brake arm operatively attached to said second straight spring segment, said elastic behaving spring operatively connecting to said bilaterally symmetrical device, whereby force transmitted from said bicycle cable along said first straight spring segment is the same magnitude and in the same direction as the magnitude and direction of said force transmitted along said second straight spring segment, said force along each said first straight spring segment being the same magnitude and same direction as said force along said second straight spring segment whenever said first straight spring segment twists or flexes three-dimensionally and independently of said second straight spring segment, E. said bicycle brake assembly further comprising a first brake shoe and a second brake shoe, said force along each said first and second straight spring segments being transmitted to said brake shoes, said force transmitted to said first brake shoe being equal in magnitude and direction to said force transmitted to said second brake shoe, said bilaterally symmetrical device further comprising F. a slide guide and a slide member.

12. A bicycle brake assembly operatively mounted upon a bicycle, said bicycle brake assembly comprising A. a bilaterally symmetrical device, B. a first brake arm and a second overlapping brake arm, said brake arms operatively connected to said bilaterally symmetrical device, C. a bicycle cable operatively connected to said bilaterally symmetrical device and said brake arms, D. an elastic behaving spring, said spring comprising a first straight spring segment and a second straight spring segment, said first brake arm operatively attached to said first straight spring segment, said second overlapping brake arm operatively attached to said second straight spring segment, said elastic behaving spring operatively connecting to said bilaterally symmetrical device, whereby force transmitted from said bicycle cable along said first straight spring segment is the same magnitude and in the same direction as the magnitude and direction of said force transmitted along said second straight spring segment, said force along each said first straight spring segment being the same magnitude and same direction as said force along said second straight spring segment whenever said first straight spring segment twists or flexes three-dimensionally and independently of said second straight spring segment, said bicycle brake assembly further comprising E. a first brake shoe and a second brake shoe, said force along each said first and second straight spring segments being transmitted to said brake shoes, said force transmitted to said first brake shoe being equal in magnitude and direction to said force transmitted to said second brake shoe, said bilaterally symmetrical device further comprising F. a slide guide and a slide member, said slide guide being structurally adapted to confine movement of said slide member to one vertical dimension, said slide member being confined within said guide member.

13. A bilaterally symmetrical bicycle brake assembly comprising (A) a slide guide, said slide guide comprising a first longitudinal slot and a second longitudinal slot, (B) a slide member, said slide member adapted to move vertically within said slide guide, (C) a slide bolt engaging said slide member, said slide bolt further engaging said first and second longitudinal slots, (D) a first brake arm and a second brake arm, said first and second brake arms pivotally connected to each other, and (F) a torsion spring attaching to said slide bolt and said brake arms, whereby said bilaterally symmetrical bicycle brake assembly is structurally adapted to operatively attach to bicycle brake shoes and bicycle brake cables, said torsion spring thereby flexing said brake arms, and said brake arms pressing said bicycle brake shoes against a bicycle rim.

* * * * *